(12) United States Patent
Lorentz

(10) Patent No.: US 7,607,252 B1
(45) Date of Patent: Oct. 27, 2009

(54) METHOD OF RETRIEVING FISHING GEAR

(76) Inventor: Patrick J. Lorentz, 3461 Nebula Cir., Anchorage, AK (US) 99517

(*) Notice: Subject to any disclaimer, the term of this patent is extended or adjusted under 35 U.S.C. 154(b) by 0 days.

(21) Appl. No.: 12/317,283

(22) Filed: Dec. 22, 2008

Related U.S. Application Data

(62) Division of application No. 11/729,719, filed on Mar. 29, 2007, now abandoned.

(51) Int. Cl.
*A01K 69/06* (2006.01)
*A01K 79/00* (2006.01)
*A01K 97/14* (2006.01)

(52) U.S. Cl. .............. 43/4.5; 43/17.2; 43/100; 43/5; 114/382; 294/82.1; 294/66.1; 441/136

(58) Field of Classification Search ............. 43/17.2, 43/100, 5, 44.82, 44.83, 6.5, 4.5, 4, 8, 27.2, 43/27.4; 294/82.1, 86.1, 66.1, 17, 19.3, 26; 114/255, 312, 326, 210, 294, 382; 441/1, 441/136
See application file for complete search history.

(56) References Cited

U.S. PATENT DOCUMENTS

| | | | | | |
|---|---|---|---|---|---|
| 13,649 | A | * | 10/1855 | Johnson | 43/4.5 |
| 174,448 | A | * | 3/1876 | Toselli | 294/66.1 |
| 428,724 | A | * | 5/1890 | Koster | 294/17 |
| 515,875 | A | * | 3/1894 | Dreese | 294/19.3 |
| 521,963 | A | * | 6/1894 | Nason | 294/106 |
| 605,221 | A | * | 6/1898 | David | 294/66.1 |
| 681,733 | A | * | 9/1901 | Rasmussen | 294/66.1 |
| 746,455 | A | * | 12/1903 | Campbell | 294/19.3 |
| 964,375 | A | * | 7/1910 | Bjornseth | 294/19.3 |
| 1,031,903 | A | * | 7/1912 | Anderson | 294/66.1 |
| 1,080,868 | A | * | 12/1913 | Turner | 43/5 |
| 1,148,740 | A | * | 8/1915 | Batla | 43/5 |
| 1,252,518 | A | * | 1/1918 | Walton | 43/8 |
| 1,457,401 | A | * | 6/1923 | Smith | 294/19.3 |
| 1,468,928 | A | * | 9/1923 | Steadman | 294/82.1 |
| 1,534,954 | A | * | 4/1925 | Holtz | 294/19.3 |
| 1,555,748 | A | * | 9/1925 | Lutz | 294/26 |
| 1,696,053 | A | * | 12/1928 | Pasini | 114/326 |

(Continued)

FOREIGN PATENT DOCUMENTS

| | | | | |
|---|---|---|---|---|
| FR | 2840155 | A1 | * | 12/2003 |
| FR | 2844148 | A1 | * | 3/2004 |
| GB | 2344268 | A | * | 6/2000 |
| JP | 2001321053 | A | * | 11/2001 |
| JP | 2003134962 | A | * | 5/2003 |
| WO | WO 8103107 | A1 | * | 11/1981 |

*Primary Examiner*—Darren W Ark
(74) *Attorney, Agent, or Firm*—Michael J. Tavella

(57) ABSTRACT

An apparatus that enables the fishing pots to be lifted with ease. The system includes a hook embedded in the gear rope near the first pot. The string of pots is set normally, with the end of the rope marked with a buoy. To retrieve the pots, the buoy is pulled up onto the boat and the rope is tied off. An anchor-pulling ring with a buoy attached is placed around the line. The boat is driven in the opposite direction as the current or tide. This causes the pot rope to be pulled up, with the pots. The rope passes through the anchor-pulling ring until the hook passes through the ring. The line can be slacked off and the hook will catch the ring and hold the pots while the remainder of the rope is retrieved. Once the boat reaches the buoy, the pots can easily be pulled up.

5 Claims, 8 Drawing Sheets

U.S. PATENT DOCUMENTS

| | | | | | |
|---|---|---|---|---|---|
| 1,776,680 | A | * | 9/1930 | Doyle | 294/19.3 |
| 1,796,197 | A | * | 3/1931 | Galbraith | 294/19.3 |
| 1,982,132 | A | * | 11/1934 | Boles | 43/5 |
| 2,210,271 | A | * | 8/1940 | Thwaits | 43/5 |
| 2,235,371 | A | * | 3/1941 | Jyrkas | 43/5 |
| 2,313,599 | A | * | 3/1943 | Surges | 294/19.3 |
| 2,334,613 | A | * | 11/1943 | Dunkelberger et al. | 43/44.82 |
| 2,338,067 | A | * | 12/1943 | Wicklow | 114/326 |
| 2,345,197 | A | * | 3/1944 | Hirsch et al. | 43/44.82 |
| 2,424,040 | A | * | 7/1947 | Long | 294/66.1 |
| 2,443,061 | A | * | 6/1948 | Waltamath | 43/17.2 |
| 2,479,448 | A | * | 8/1949 | Woock Walter | 43/17.2 |
| 2,482,057 | A | * | 9/1949 | Fincke | 43/4 |
| 2,490,583 | A | * | 12/1949 | Dunkelberger | 43/44.82 |
| 2,554,735 | A | * | 5/1951 | Gibson | 43/44.82 |
| 2,594,120 | A | * | 4/1952 | Busher | 43/17.2 |
| 2,656,642 | A | * | 10/1953 | Richa | 43/100 |
| 2,661,978 | A | * | 12/1953 | Lauro | 294/66.1 |
| 2,738,217 | A | * | 3/1956 | Hibbard et al. | 294/66.1 |
| 2,807,906 | A | * | 10/1957 | Mun | 43/5 |
| 2,854,781 | A | * | 10/1958 | Scozzari | 43/44.83 |
| 2,864,196 | A | * | 12/1958 | Rohan | 43/6 |
| 3,034,767 | A | * | 5/1962 | Gordon | 43/4.5 |
| 3,041,043 | A | * | 6/1962 | Harden | 294/82.1 |
| 3,062,168 | A | * | 11/1962 | Backe | 114/294 |
| 3,092,412 | A | * | 6/1963 | Drake | 43/44.82 |
| 3,092,925 | A | * | 6/1963 | Ho et al. | 43/5 |
| 3,095,662 | A | * | 7/1963 | Puckett | 43/5 |
| 3,097,373 | A | * | 7/1963 | Wisti | 294/66.1 |
| 3,123,930 | A | * | 3/1964 | Rimar | 43/5 |
| 3,130,703 | A | * | 4/1964 | Thompson | 114/294 |
| 3,134,190 | A | * | 5/1964 | Triplett et al. | 43/44.82 |
| 3,267,603 | A | * | 8/1966 | Nancy et al. | 43/5 |
| 3,331,151 | A | * | 7/1967 | Turrentine | 43/44.82 |
| 3,336,067 | A | * | 8/1967 | Cloyd | 43/17.2 |
| 3,401,478 | A | * | 9/1968 | Lambert | 43/5 |
| 3,462,870 | A | * | 8/1969 | Terilli | 43/8 |
| 3,550,303 | A | * | 12/1970 | Delroy | 43/17.2 |
| 3,579,894 | A | * | 5/1971 | Kidder | 294/19.3 |
| 3,620,181 | A | * | 11/1971 | Naczkowski | 114/294 |
| 3,626,703 | A | * | 12/1971 | Richburg | 114/312 |
| 3,643,366 | A | * | 2/1972 | Gates | 43/17.2 |
| 3,654,721 | A | * | 4/1972 | Coleman | 43/6.5 |
| 3,722,126 | A | * | 3/1973 | Whipple et al. | 43/6.5 |
| 3,724,120 | A | * | 4/1973 | Richard | 43/100 |
| 3,729,854 | A | * | 5/1973 | Satama | 43/17.2 |
| 3,731,931 | A | * | 5/1973 | Monaco | 294/66.1 |
| 3,769,734 | A | * | 11/1973 | Winkler | 43/17.2 |
| 3,833,252 | A | * | 9/1974 | Redding | 43/5 |
| 3,838,657 | A | * | 10/1974 | Fleming | 114/294 |
| RE28,380 | E | * | 4/1975 | Tison | 43/6.5 |
| 3,936,895 | A | * | 2/1976 | Talkington | 114/312 |
| 3,986,287 | A | * | 10/1976 | Arteaga | 43/5 |
| 3,999,325 | A | * | 12/1976 | Folker | 43/44.82 |
| 3,999,326 | A | * | 12/1976 | Wolf | 43/44.82 |
| 4,133,569 | A | * | 1/1979 | Pavack et al. | 294/66.1 |
| 4,152,859 | A | * | 5/1979 | Hansen | 43/17.2 |
| 4,188,744 | A | * | 2/1980 | Tochtrop | 43/44.82 |
| 4,223,465 | A | * | 9/1980 | Nichols | 43/17.2 |
| 4,234,164 | A | * | 11/1980 | Ruark | 43/8 |
| 4,237,642 | A | * | 12/1980 | Petorella | 43/27.4 |
| 4,262,379 | A | * | 4/1981 | Jankiewicz | 43/100 |
| 4,321,766 | A | * | 3/1982 | Henderson | 43/6.5 |
| 4,326,744 | A | * | 4/1982 | Long, III | 294/82.1 |
| 4,354,667 | A | * | 10/1982 | Svendsen | 43/8 |
| 4,384,426 | A | * | 5/1983 | Steeve | 43/44.82 |
| 4,433,829 | A | * | 2/1984 | Grover et al. | 294/17 |
| 4,445,295 | A | * | 5/1984 | Litrico | 43/100 |
| 4,467,547 | A | * | 8/1984 | Chabot | 43/17.2 |
| 4,506,470 | A | * | 3/1985 | Adams | 43/44.82 |
| 4,511,122 | A | * | 4/1985 | Svendsen | 254/332 |
| 4,638,591 | A | * | 1/1987 | Neumann et al. | 43/5 |
| 4,644,682 | A | * | 2/1987 | Cloud | 43/100 |
| 4,648,194 | A | * | 3/1987 | Carroll, Jr. | 43/4.5 |
| 4,696,124 | A | * | 9/1987 | Wille | 43/27.4 |
| 4,702,507 | A | * | 10/1987 | Medendorp | 294/66.1 |
| 4,733,492 | A | * | 3/1988 | Thompson | 43/27.4 |
| 4,920,680 | A | * | 5/1990 | Lindgren | 43/4.5 |
| D315,593 | S | * | 3/1991 | Zappe | D22/144 |
| 5,165,174 | A | * | 11/1992 | Brown, Jr. | 43/6.5 |
| 5,187,893 | A | * | 2/1993 | Knight | 43/100 |
| 5,216,828 | A | * | 6/1993 | Langstone | 43/17.2 |
| 5,342,229 | A | * | 8/1994 | Whitt | 114/294 |
| 5,666,758 | A | * | 9/1997 | Vaillier et al. | 43/17.2 |
| 5,704,156 | A | * | 1/1998 | DiLello | 43/5 |
| 5,832,651 | A | * | 11/1998 | Arntz | 43/5 |
| 5,913,670 | A | * | 6/1999 | Anderson et al. | 43/4.5 |
| 6,065,239 | A | * | 5/2000 | Thomas et al. | 43/4.5 |
| 6,247,264 | B1 | * | 6/2001 | Prosol | 43/100 |
| 6,463,692 | B1 | * | 10/2002 | Johnsen | 43/17.2 |
| 6,880,290 | B2 | * | 4/2005 | Mahoney | 43/100 |
| 2003/0182844 | A1 | * | 10/2003 | Berthold | 43/44.83 |
| 2007/0107649 | A1 | * | 5/2007 | Tolbert | 114/294 |
| 2008/0271362 | A1 | * | 11/2008 | Mikhail | 43/100 |
| 2009/0064563 | A1 | * | 3/2009 | Carlin | 43/4 |

* cited by examiner

METHOD OF RETRIEVING FISHING GEAR

CROSS REFERENCE TO RELATED APPLICATIONS

This application is a division of application Ser. No. 11/729,719 filed Mar. 29, 2007, now abandoned.

STATEMENT REGARDING FEDERALLY SPONSORED RESEARCH AND DEVELOPMENT

Not Applicable

BACKGROUND OF THE INVENTION

1. Field of the Invention

This invention relates to systems and methods for retrieving fishing gear and particularly to systems and methods for retrieving fishing gear that utilize embedded hooks in a line of traps.

2. Description of the Prior Art

Large-scale commercial shellfish fishing involves the use of large traps (crab pots, for example) that can weigh several hundred pounds apiece. These traps (pots) are laid out on long strings and heavy-duty winches are required to pull them up from the sea floor.

There are smaller types of shellfish pots that are used by individual sport fisherpersons. For example, a sport fishing shrimp pot weighs only a few pounds. Typically, around five pots are set in a string. Of course, fewer or more pots can be used as well. Like the commercial pots, these pots are allowed to "soak" for hours or days to allow the pots to be filled.

Retrieving the pots is a difficult task, even though there are fewer pots and they weigh less. This is because they are set at or near the bottom, which usually requires a long length of rope. Pulling up this rope with the pots attached can be a hard job without a winch. However, most sport fishing boats do not have such equipment.

BRIEF DESCRIPTION OF THE INVENTION

The instant invention overcomes this problem. It is a system that enables the pots to be lifted with ease and without the requirement of expensive winching equipment.

The system includes a treble style hook that is embedded in the gear rope near the first pot. Once this hook is set in the rope, the string of pots is set normally. The end of the rope is marked with a buoy, as usual.

To retrieve the pots, the buoy is pulled up onto the boat and the rope is tied to a cleat. An anchor-pulling ring with a buoy attached is then placed around the line in the water. The boat is driven in the opposite direction as the current or tide. This causes the pot rope to be pulled up, with the pots. The rope passes through the anchor-pulling ring. Eventually, the treble hook will pass through the ring. When this happens, the boat is stopped and rope is allowed to go slack (just a few feet), this causes the rope to pass backwards through the ring (due to the weight of the pots). When the hook reaches the ring, however, it is caught by the ring. The pots are now being held near the surface of the water.

Now, the excess rope can be gathered up (without the weight of the pots to contend with) as the boat approaches the buoy. Once the boat reaches the buoy, the buoy is retrieved and the pots can be pulled with much less difficulty.

DETAILED DESCRIPTION OF THE INVENTION

Figure 1:
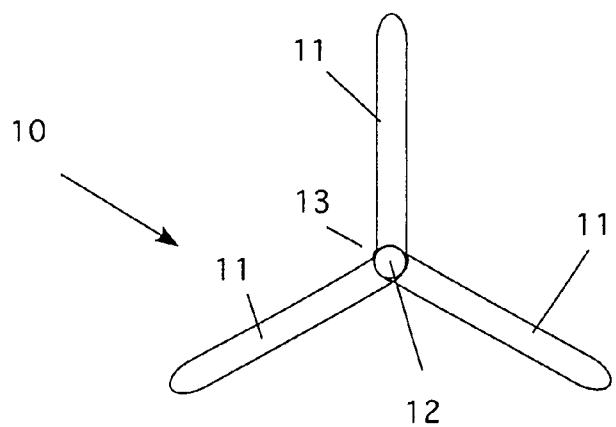
FIG. 1 is a top view of the large size hook used in this invention.
Figure 2:
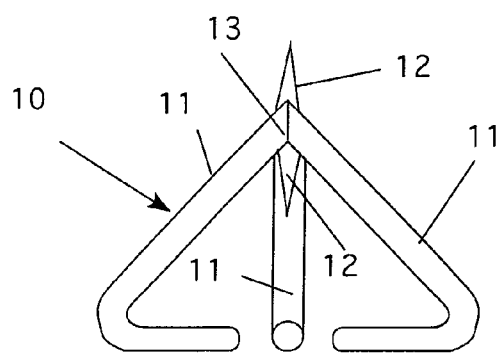
FIG. 2 is a front view of the large size hook used in this invention.
Figure 3:
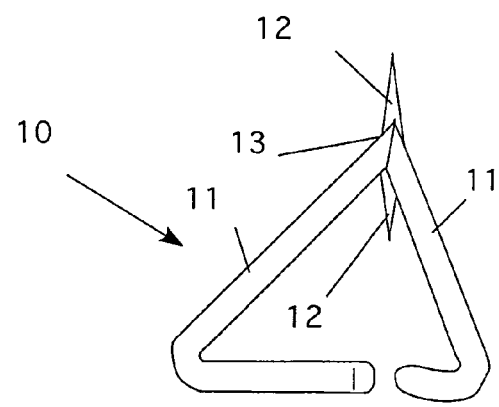
FIG. 3 is a side view of the large size hook used in this invention.

Referring now to FIG. 1, a top view of the large size hook used in this invention is shown. FIG. 2 is a front view of the large size hook used in this invention. FIG. 3 is a side view of the large size hook used in this invention. The hook 10 in this size is hook is made of ¼-inch stainless steel rod. This hook is sized to be used with rope or line between about ⅛ inches and ¾ inches in diameter. FIG. 2 shows the front view. The hook has three curved elements 11 as shown that meet at a central point, or hub, 13 at the top of the curved elements. Two prongs 12 are also formed on the hook. The prongs are used when attaching the hook to a line, as discussed below. The over all shape of the hooks is important in its use, as discussed below. Note that when the stainless steel is used, welding techniques suitable for stainless steel must also be used. Although stainless steel is preferred, the hook can be made of high-strength plastic as well as any other suitable material.

Figure 4:
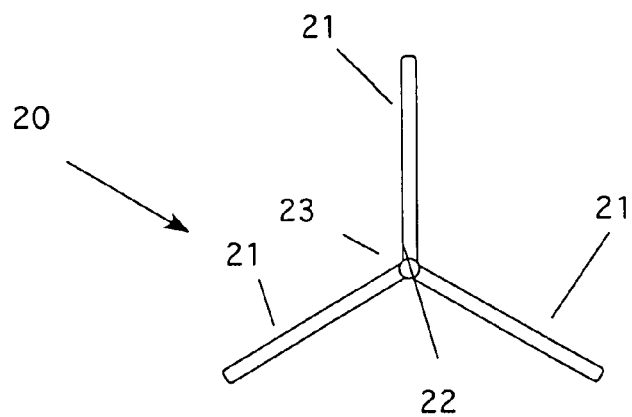
FIG. 4 is a top view of the small size hook used in this invention.
Figure 5:
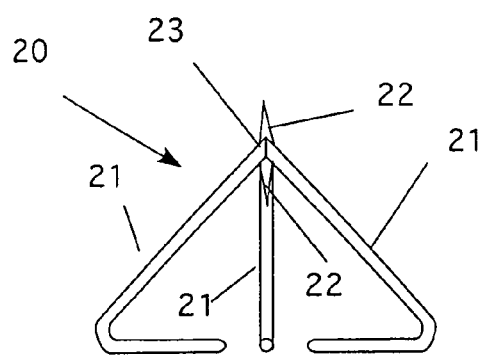
FIG. 5 is a front view of the small size hook used in this invention.
Figure 6:
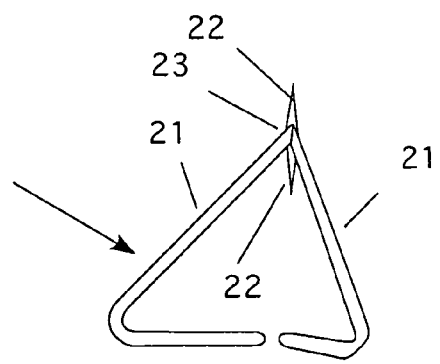
FIG. 6 is a side view of the small size hook used in this invention.

FIG. 4 is a top view of the small size hook used in this invention. FIG. 5 is a front view of the small size hook used in this invention. FIG. 6 is a side view of the small size hook used in this invention. In the preferred embodiment, this hook 20 in this size is hook is made of 3/16-inch stainless steel rod. This hook is sized to be used with rope or line between about ⅛ inches and ¾ inches in diameter. FIG. 2 shows the front view. The hook has three curved elements 21 as shown. Two prongs 22 are also formed on the hook. As above, the prongs are used when attaching the hook to a line, as discussed below. As before, this hook can be made of high-strength plastic as well as any other suitable material.

The over all shape of the hooks is important in its use, as discussed below. In ordinary use, the shrimp/crab pots are laid out on a line. For most sport fisherpersons, 5 pots in a string is typical. The end of the line is secured to a buoy. Now, the first pot may be several hundred feet below the surface. To retrieve the pots, the boat comes alongside the buoy and the rope is pulled up. On large commercial vessels, winches make easy work out of the task of retrieving hundreds of feet of line before the first pot can be recovered. On most sport boats, however, such equipment is simply not available or cost prohibitive.

This is where the instant invention is useful. Before the line of pots is released into the sea, one of the hooks is embedded in the line a few feet above the first pot (see FIG. 11). The hook is embedded in the line as discussed below. Once the hook is embedded in the line and oriented correctly (see FIG. 7), the device is ready to use.

Figure 7:
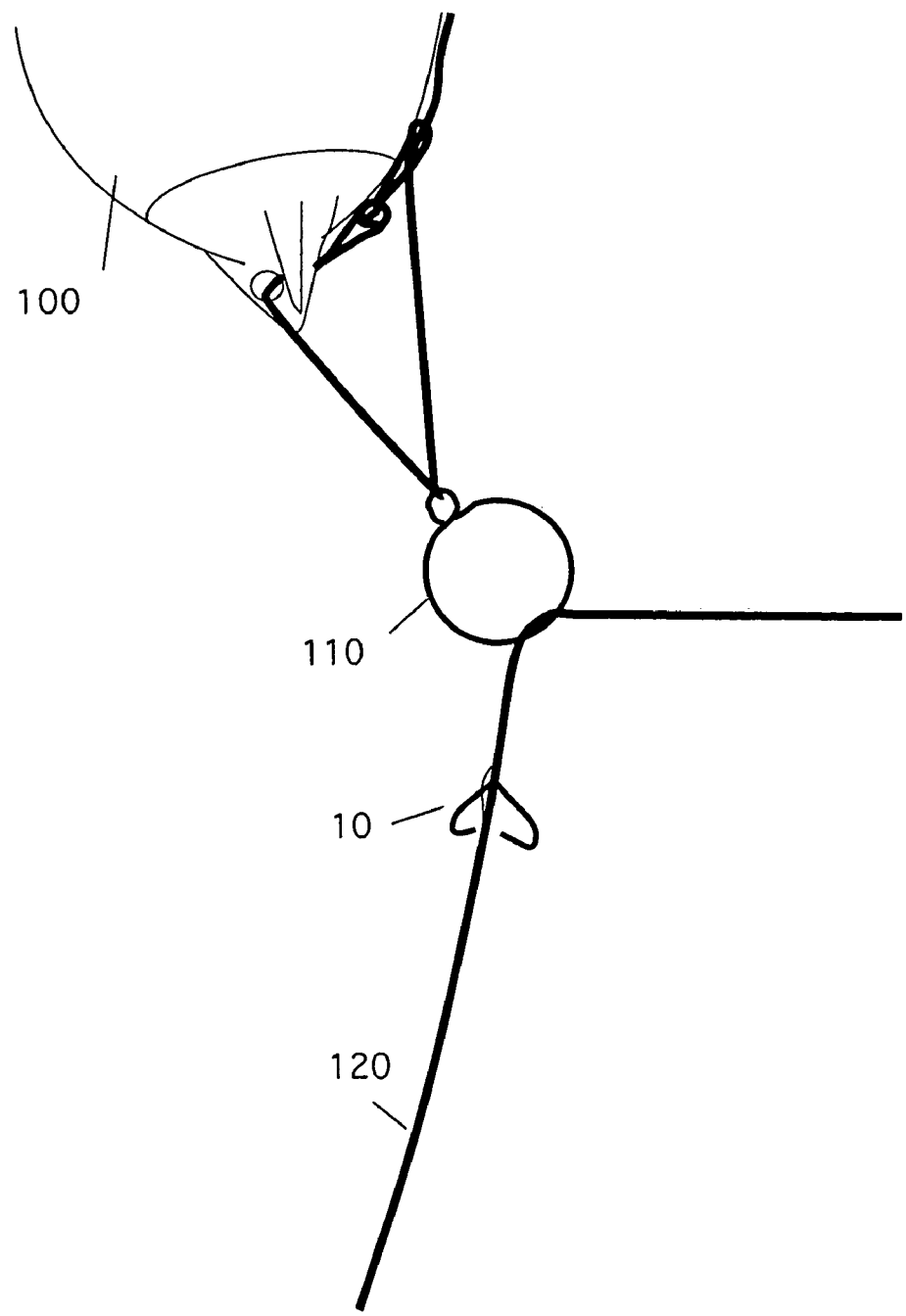
FIG. 7 is a view of the invention in place as the line is being pulled up by the boat.
Figure 8:
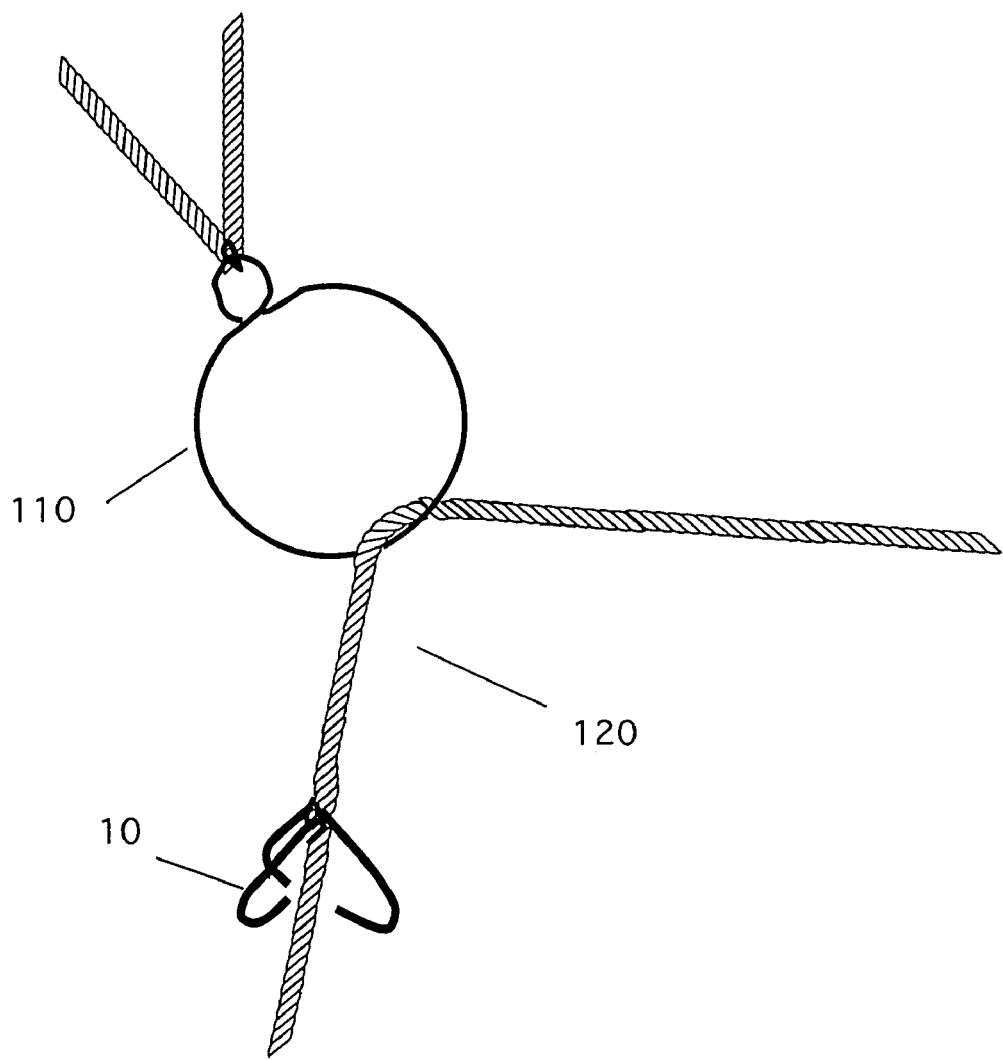
FIG. 8 is an enlarged view of the hook in place in the line as the line is being pulled up.

Normally, a string of pots is dropped overboard in a line. The pots are designed to rest on the bottom. A line is attached from the first pot of the string that runs to the surface. A buoy is attached to the end of this line to mark the position of string. To pull the line of pots, the buoy is retrieved. The line is then tied off on a cleat on the boat. An anchor pulling ring and buoy is then attached to the line. Next, the boat is driven in the opposite direction of the current or tide. The rope passes through the anchor ring as the boat is moved forward. FIG. 7 is a view of the invention in place as the line is being pulled up by the boat. Here, the buoy 100, the anchor ring 110 and line 120 are shown. The hook 10 (or 20 depending on the size of the line), is shown approaching the anchor ring. FIG. 8 is an enlarged view of the hook in place in the line as the line is being pulled up.

Figure 9:
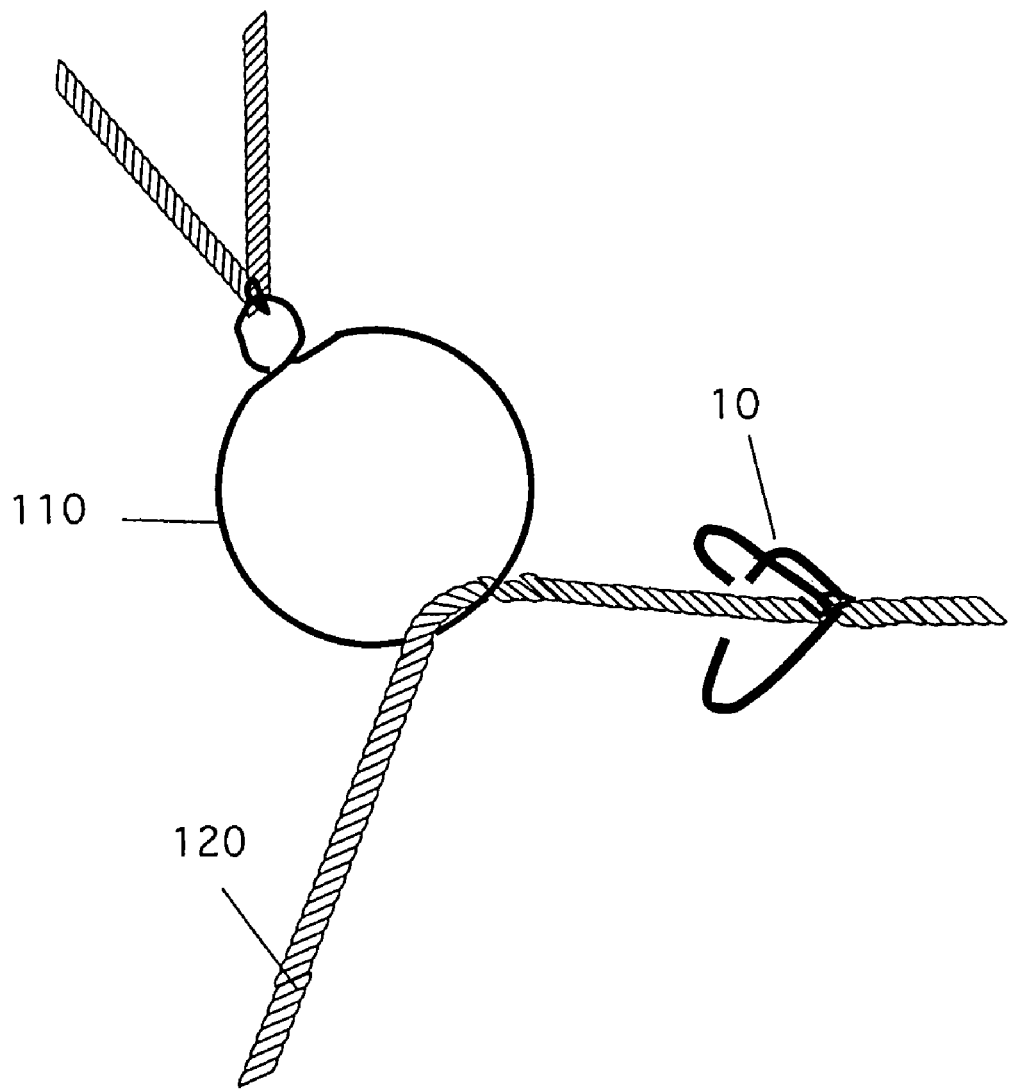
FIG. 9 is an enlarged view of the line being pulled up and the hook having just passed through the anchor ring.

The line 120 is pulled further until the hook 10 passes through the anchor ring 110 as shown in FIG. 9, which is an enlarged view of the line being pulled up and the hook having just passed through the anchor ring.

Figure 10:
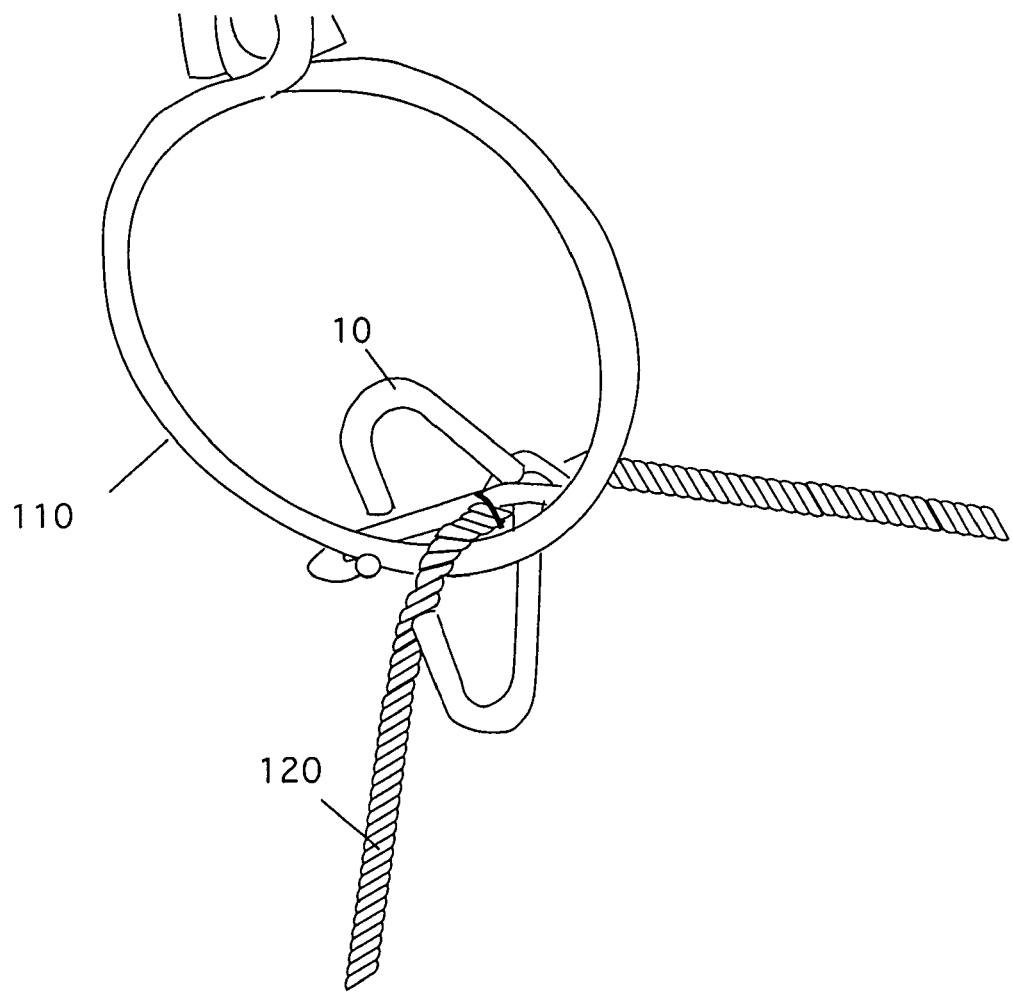
FIG. 10 is an enlarged view of the hook catching on the anchor ring after the line has been slacked off.

Once the hook has passed through the anchor ring, the boat is stopped and reversed. This creates slack in the line 120, which allows the line to fall back due to the weight of the pots. However, when the hook 10 arrives at the anchor ring 110, the curved members engage the ring and lock on the ring. This prevents the pots from falling back down. At the same time, it leaves the line ahead of the hook slack, as the weight is now being carried by the buoy. FIG. 10 is an enlarged view the hook catching on the anchor ring after the line has been slacked off.

Figure 11:
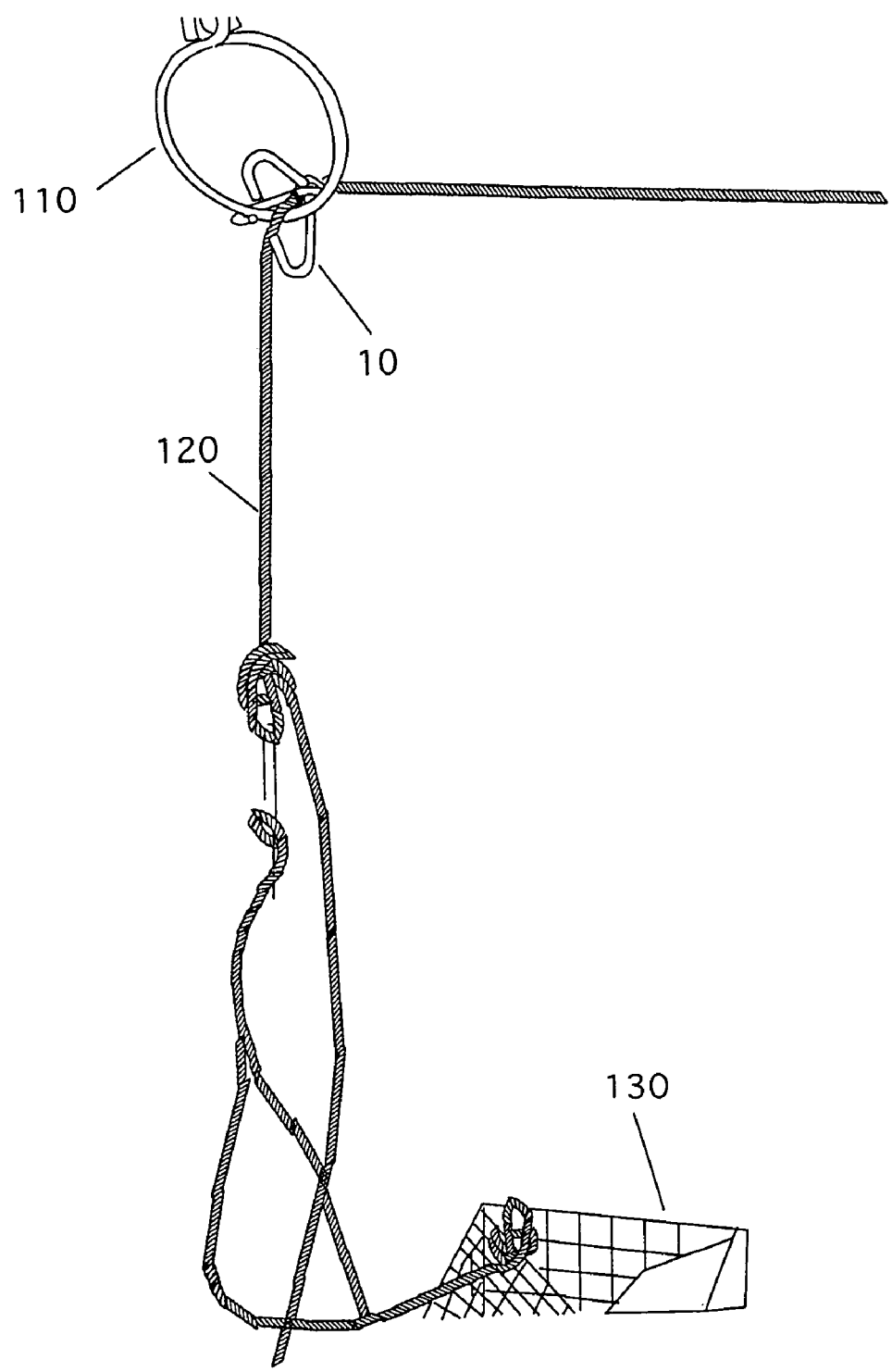
FIG. 11 is a view of the anchor ring with the hook engaged, and the placement 2 of the crab pot below the hook.

FIG. 11 is a view of the anchor ring with the hook engaged, and the placement of the crab pot below the hook. In this figure, it is clear that the pot 130 and its associated gear are near the surface of the water. Once this has been achieved, the slack rope is simply gathered up until the boat is at the anchor ring and buoy. At this point, the pots can be pulled up and retrieved.

To redeploy the pots, the buoy and anchor ring are removed from the line, the pots are baited, and dropped into the sea. Once fully deployed, the original marker buoy marks the position as before and the system is primed for retrieval after a normal period of soaking time.

Figure 12:
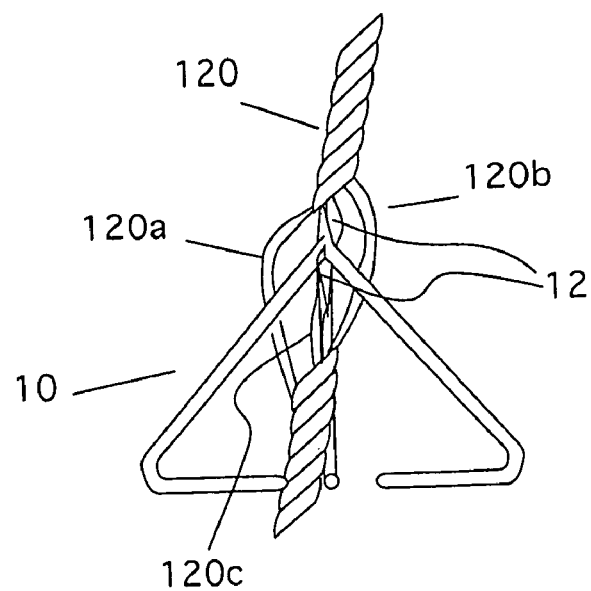
FIG. 12 is a detail view of the unlayed rope showing the hook in place.
Figure 13:
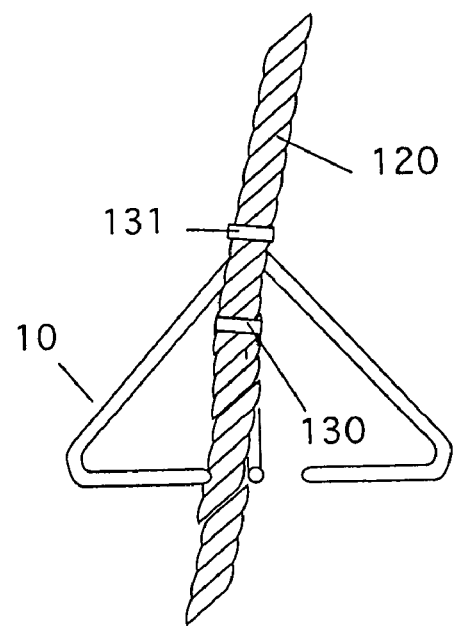
FIG. 13 is a detail view of the rope with the hook installed and secured.

All of this depends on placing the hook properly in the line. This is done by unlaying the rope. Unlaying the rope simply means to loosen the strands of the line by twisting the rope in the opposite direction of the twist of the line. Referring now to FIGS. 12 and 13, to install the hook (10 or 20), first, locate the desired spot on the rope 120 to insert the hook 10. Remember this is a directional unit it will pass through the anchor ring one-way but not the other, so it is important to position the curved members towards the load (the shrimp/crab pot, anchor, etc).

Next, insert the hook 10 into a rope 120 by UNLAYING the rope and passing two of the curved members through it. FIG. 12 shows the unlayed rope with strands 120a, 120b and 120c. Position it so that the prongs 12 are in line with the run of the line as shown. Then, relay the rope by twisting it with the hook located in the middle.

FIG. 13 shows the hook embedded in the relayed line.

Finally, to secure the hook 10 in place, place a hog ring 130 (a crimpable metal ring) on the bottom side and crimp loosely. Pull the rope until the hog ring (crimp) is snug on the center prong 12 in the middle of the hook. Place a second hog ring 131 (crimp) on the top around the rope and upper prong and crimp tightly. This will keep the rope centered. Once the hook is positioned in the rope, it is extremely secure, as tension on the rope only works to tighten the strands around the hook.

Note also that the only difference between hook 10 and hook 20 is the size of the hook and the size of the rope in which it is embedded.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of retrieving at least one marine article attached to a rope line and a marker buoy comprising:
   a) embedding a hook into said rope line at a point near said at least one marine article;
   b) placing said at least one marine article in water such that said marker buoy floats on a surface of said water to indicate a position of said at least one marine article;
   c) pulling up said market buoy and a portion of said rope line into a boat;
   d) tying off said rope line to a cleat on said boat;
   e) passing said rope line through an anchor ring attached to a second buoy;
   f) letting said second buoy float on said water;
   g) moving said boat away from said second buoy, thereby pulling said rope line and causing said at least one marine article to approach the surface of said water until said hook passes through said anchor ring;
   h) reversing the boat to allow the line to reversely pass through the anchor ring until the hook catches the anchor ring;
   i) retrieving the rope line as the boat returns to the second buoy;
   j) pulling said second buoy and rope line into said boat until the at least one marine article has been recovered.

2. The method of claim 1 wherein the at least one marine article is selected from the group of: boat anchors, shrimp pots and crab pots.

3. The method of claim 1 wherein the hook has:
   a) three curved elements, each of said curved elements having a top and further wherein the tops of said curved elements are attached at a central point;
   b) a first prong, attached to said central point and extending upwardly therefrom; and
   c) a second prong, attached to said central point and extending downwardly therefrom.

4. The method of claim 3 wherein the step of embedding the hook comprises the steps of:
   a) unlaying said rope line to form at least two separate strands in one section of said rope line;
   b) inserting said hook into said strands such that said first and second prongs are in line with said rope line; and
   c) relaying said rope line, thereby causing the at least two strands to close about said first and second prongs.

5. The method of claim 4 further comprising the steps of:
   a) placing a first crimp ring about said rope line at a position of said first prong;
   b) crimping said first crimp ring about said rope line and said first prong;
   c) placing a second crimp ring about said rope line at a position of said second prong; and
   d) crimping said second crimp ring about said rope line and said second prong.

* * * * *